United States Patent
McIntyre

(10) Patent No.: US 7,141,936 B2
(45) Date of Patent: Nov. 28, 2006

(54) DRIVING CIRCUIT FOR LIGHT EMITTING DIODE

(75) Inventor: Harry J. McIntyre, Los Angeles, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/984,742

(22) Filed: Nov. 10, 2004

(65) Prior Publication Data

US 2006/0097654 A1    May 11, 2006

(51) Int. Cl.
  *H05B 37/02*  (2006.01)
(52) U.S. Cl. .................. 315/209 R; 315/307; 315/308
(58) Field of Classification Search ................ 327/538, 327/543, 530, 108; 323/315, 316; 315/169.3, 315/186, 185, 193, 307–308, 209 R; 326/30, 326/31
  See application file for complete search history.

(56) References Cited

U.S. PATENT DOCUMENTS

| 5,361,156 | A   |   | 11/1994 | Pidgeon ...................... 359/161 |
|---|---|---|---|---|
| 5,402,433 | A   |   | 3/1995  | Stiscia ......................... 327/31 |
| 5,666,046 | A   | * | 9/1997  | Mietus ........................ 323/313 |
| 5,694,033 | A   | * | 12/1997 | Wei et al. .................... 323/315 |
| 5,705,895 | A   | * | 1/1998  | Mihara ........................ 315/307 |
| 5,760,640 | A   | * | 6/1998  | Girard et al. ................ 327/543 |
| 5,821,768 | A   | * | 10/1998 | Rau ............................ 326/31 |
| 6,181,195 | B1  | * | 1/2001  | McIntyre .................... 327/538 |
| 6,222,357 | B1  | * | 4/2001  | Sakuragi ..................... 323/315 |
| 6,522,673 | B1  |   | 2/2003  | Williamson, III et al. ..................... 372/29.021 |
| 6,549,073 | B1  |   | 4/2003  | McIntyre .................... 330/253 |
| 6,587,000 | B1  |   | 7/2003  | Oikawa ....................... 330/288 |
| 6,646,463 | B1  |   | 11/2003 | Hariton ....................... 326/30 |
| 6,710,632 | B1  | * | 3/2004  | Tada ........................... 327/108 |
| 6,747,508 | B1  | * | 6/2004  | Liu et al. ..................... 327/543 |
| 2003/0138024 | A1 |   | 7/2003  | Williamson et al. ... 372/29.021 |
| 2004/0022537 | A1 |   | 2/2004  | Mecherle et al. ........... 398/128 |
| 2004/0046532 | A1 | * | 3/2004  | Menegoli et al. ........... 323/273 |
| 2004/0067061 | A1 |   | 4/2004  | Jiang et al. .................. 398/135 |
| 2004/0078150 | A1 |   | 4/2004  | Zhang ......................... 702/40 |
| 2005/0162200 | A1 | * | 7/2005  | Haerle ......................... 327/157 |
| 2005/0218983 | A1 | * | 10/2005 | Matsuda et al. ............. 330/257 |
| 2006/0050584 | A1 | * | 3/2006  | Gogl et al. .................. 365/207 |

* cited by examiner

*Primary Examiner*—Hoanganh Le
*Assistant Examiner*—Tung Le
(74) *Attorney, Agent, or Firm*—Oliff & Berridge, PLC

(57) ABSTRACT

A driving circuit for a light emitting diode may include two transistors and an operational amplifier. The operational amplifier may act to cause the output voltages of the drain terminals of the transistors to be substantially equal, making the light emitting diode forward current substantially equal to the reference current. This current may provide a steady drive current, even when the supply voltage varies over a wide range.

20 Claims, 2 Drawing Sheets

DRIVING CIRCUIT FOR LIGHT EMITTING DIODE

BACKGROUND OF THE INVENTION

1. Field of Invention

This invention is directed to driving circuits for light emitting diodes.

2. Description of Related Art

Light emitting diodes (LEDs) are driven by applying a high potential to the anode terminal of the light emitting diode and a ground potential to the cathode terminal. Current flowing between the terminals creates electron-hole pairs, which recombine to emit light over a spectral range defined by the band gap of the diode. If the light emitting diode is made of the appropriate materials and placed between reflecting surfaces to form an optical cavity, a light emitting diode may emit coherent light and thereby form a light emitting diode laser. In many cases, the cleaved edges of the device have sufficient reflectivity to form the optical cavity and allow the diode to operate as a laser.

In printing system applications, laser light intensity control of 1% accuracy or greater is required. The light intensity of a laser varies linearly with the current flowing through the laser, once the laser is lasing. Semiconductor lasers are diodes, and lase at a forward bias voltage level. The forward bias voltage changes little with current, but may vary from laser to laser. Hence, laser drivers are current drivers delivering a current to the laser that is independent of voltage conditions, ideally. Voltage conditions can vary due to power supply fluctuations and the differing forward bias voltages of the laser diodes. Furthermore, heating of the current driver increases the internal resistance of the current driver, causing the current driver to require more voltage to maintain the same current. If a forward bias voltage of the laser diode is small and the power supply voltage is large, the laser driver has an ample supply voltage range to provide the level of current needed. If the forward bias voltage of the laser diode takes up more of the power supply range and/or the power supply voltage becomes less, and/or if the current source heats up, the laser driver must supply the same current with the reduced voltage supply range. A laser driver that can deliver the same current over a wide range of voltages, particularly lower voltages, is desirable.

Typically, diodes are driven by, for example, PMOS transistors, as shown, for example, in FIG. 1. FIG. 1 shows a light emitting diode 30 coupled to a drain terminal 24 of a PMOS transistor 20 and to ground 14. A source terminal 22 of PMOS transistor 20 is coupled to a supply voltage source 10, which supplies a voltage through PMOS transistor 20 sufficient to forward bias light emitting diode 30. The amount of current delivered by PMOS 20 is controlled by the voltage at a gate terminal 26, which is coupled to a reference voltage 12. Raising the gate voltage to the supply voltage, for example, will switch off PMOS transistor 20, whereas reducing the gate voltage back to the reference voltage level will turn PMOS transistor 20 back on.

SUMMARY OF THE INVENTION

However, a number of disadvantages are present in the light emitting diode driver circuit shown in FIG. 1. For example, light emitting diode 30, as part of an optical system implementation, may need replacement, or may be updated to a different model or type of light emitting diode, thus introducing a different forward bias voltage which directly affects the voltage drop across PMOS transistor 20, affecting the current available for the light emitting diode 30. For example, the PMOS transistor 20 as part of an optical device driver may be used in several optical systems, each employing a different light emitting diode 30 with its own forward bias voltage. In each optical system, the PMOS transistor 20 will be left with a different amount of the power supply range for operation, resulting in a different current through the light emitting diode 30. For example, upon switching on, PMOS transistor 20 heats up causing its resistance to rise, which increases the voltage drop across PMOS transistor 20, and reduces the output voltage, and therefore the current available for light emitting diode 30.

Also, variations in the voltage from supply voltage source 10 may directly affect the amount of current delivered to light emitting diode 30, because the voltage delivered to input terminal 32 of light emitting diode 30 depends directly on the voltage from supply voltage source 10 through PMOS transistor 20.

Each of these sources of variability of the supply current may affect the light output properties of light emitting diode 30.

Accordingly, the driving circuit shown in FIG. 1 suffers from a number of disadvantages. Therefore, it would be advantageous to design a driving circuit for light emitting diodes which avoids these disadvantages.

A driving circuit may be provided for a light emitting diode which delivers a steady amount of driving current to the light emitting diode regardless of changes in the supply voltage, changes in the forward bias voltage of the light emitting diode, or changes in the internal resistance of the driving PMOS transistor.

A circuit may be provided for driving a light emitting diode that includes an operational amplifier which controls a gate voltage of two transistors. Inputs to the operational amplifier may be coupled to drains of the transistors, such that voltages on the drains may be kept equal by the operational amplifier. A reference current may be coupled to the drain of a first transistor, so that the operational amplifier operates to deliver a substantially equal amount of current through the drain terminal of a second PMOS transistor. The light emitting diode may be further coupled to the drain terminal of the second transistor. The first and the second transistors may be PMOS transistors. The light emitting diode may be, for example, a laser diode.

A strobe signal may be connected to the operational amplifier, which, when the strobe signal is high, disables the operational amplifier, for example, by driving the output of the operational amplifier to its positive rail, which shuts off the PMOS transistor whose drain is coupled to the light emitting diode. The strobe signal, when low, may enable the operational amplifier so that current is delivered to the light emitting diode.

These and other features and advantages of this invention are described in, or are apparent from, the following detailed description.

BRIEF DESCRIPTION OF THE DRAWINGS

Various exemplary details are described with reference to the following figures, wherein.

DETAILED DESCRIPTION

In the following description, a driving circuit for a light emitting diode includes a balancing circuit having inputs coupled to drain terminals of two transistors, and an output coupled to control gates of the two transistors. The two transistors may be PMOS transistors, and the balancing circuit may be an operational amplifier. The drain terminal of one PMOS transistor may also be coupled to a reference current source, and the drain terminal of the other PMOS transistor may be coupled to the light emitting diode. Because the operational amplifier operates to equalize its inputs, the output of the operational amplifier may adjust the control gates of the PMOS transistors until its inputs are substantially equal. This causes the current delivered to the light emitting diode to be substantially equal to the reference current supplied by the reference current source, for example, regardless of the changes in the operating voltage of the driving circuit.

Figure 2:
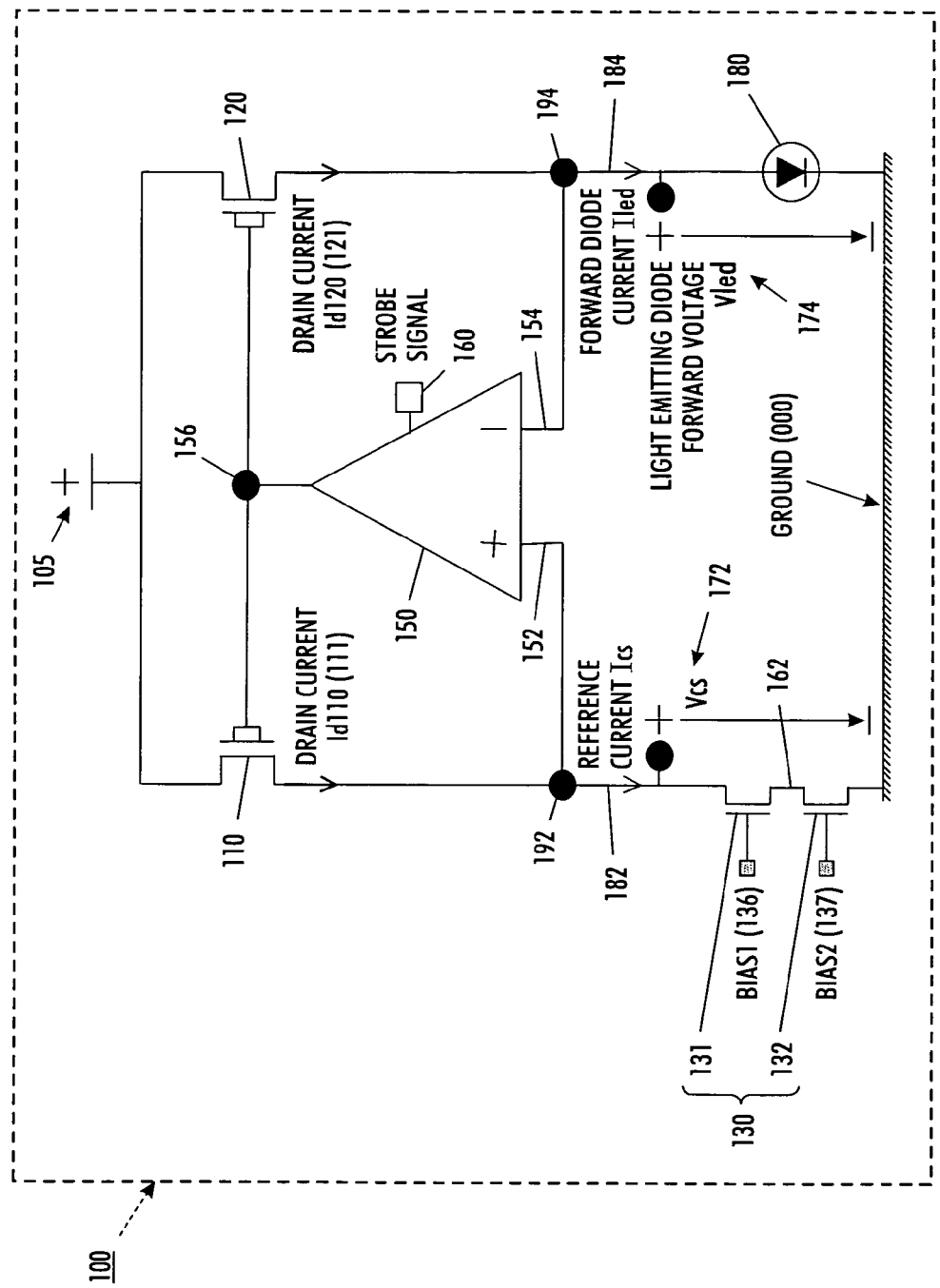
FIG. 2 is a schematic diagram of an exemplary driving circuit for a light emitting diode, using a reference current.

FIG. 2 is a schematic diagram of an exemplary driving circuit 100 for a light emitting diode. The circuit 100 includes two PMOS transistors 110 and 120, an operational amplifier 150, and light emitting diode 180. Source terminals of PMOS transistors 110 and 120 may be coupled to supply voltage source 105. The supply voltage from supply voltage source 105 may be referred to hereinafter as $V_{DD}$ and may be, for example, 5 volts.

An input voltage at the input voltage node 194 may be coupled to a negative (inverting) input terminal 154 of the operational amplifier 150. This input voltage may be the forward bias voltage 174 of a light emitting diode 180. The reference current 182 on node 192 is defined by the reference current source 130 consisting of two series NMOS transistors; NMOS transistor 131 drain terminal connected to node 192, gate terminal connected to bias voltage 136, Bias1, and source terminal connected to node 162; and NMOS transistor 132 drain terminal connected to node 162, gate terminal connected to bias voltage 137, Bias2, and source terminal connected to ground 000. This reference current may be input to the drain terminal of PMOS transistor 110 through node 192. The resulting voltage is connected to the positive (non-inverting) input terminal 152 of the operational amplifier 150 by means of node 192.

The operational amplifier acts to substantially equalize the voltage on its inputs, 152 and 154, by changing the voltage at its output 156. Changing the output voltage 156 changes the voltage at the gate inputs of PMOS transistors 110 and 120, changing the drain currents, Id110 (111) and Id120 (121), of PMOS transistors 110 and 120, delivered to nodes 192 and 194, respectively. The positive input 152 of operational amplifier 150 accepts no input current, so drain current Id110 (111) of PMOS transistor 110 is equal to the reference current Ics 182. As PMOS transistors 110 and 120 have the same source voltage 105, and the same gate voltage 156, the currents outputted from their drains are equal except for the effect of differing drain voltages on PMOS transistors 110 and 120. The negative input 154 of operational amplifier 150 accepts no input current, so the forward diode current Iled 184 is equal to the drain current Id120 (121) of PMOS transistor 120. As the characteristic of a light emitting diode is that the forward bias voltage changes little as the forward current through the light emitting diode changes, the negative input terminal 154 of the operational amplifier 150 is equal to forward bias voltage 174 and is relatively stable.

The characteristic of a current reference source is that its reference current changes little as the voltage across it changes.

If the drain current Id110 (111) of PMOS transistor 110 is larger than the reference current Ics 182, charge is accumulated onto node 192 raising the voltage on node 192 to higher levels than the voltage on the negative input terminal 154 of the operational amplifier 150. This causes the output voltage 156 of the operational amplifier 150 to increase, decreasing the drain currents Id110 (111) and Id120 (121) of PMOS transistors 110 and 120 by means of their gate terminals, until the drain current Id110 (111) of PMOS transistor 110 is made equal to the reference current Ics 182.

If the drain current Id110 (111) of PMOS transistor 110 is smaller than the reference current Ics 182, charge is drained off of node 192 lowering the voltage on node 192 to lower levels than the voltage on the negative input terminal 154 of the operational amplifier 150. This causes the output voltage 156 of the operational amplifier 150 to decrease, increasing the drain currents Id110 (111) and Id120 (121) of PMOS transistors 110 and 120 by means of their gate terminals, until the drain current Id110 (111) of PMOS transistor 110 is made equal to the reference current Ics 182.

When the drain current Id110 (111) of PMOS transistor 110 is made equal to the reference current Ics 182, voltage on the operational amplifier inputs, 152 and 154, are made substantially equal by means of the gain of the operational amplifier 150. With the operational amplifier inputs, 152 and 154, made substantially equal, the drain voltages of the PMOS transistors 110 and 120 are also substantially equal. With the gate and source voltages of PMOS transistors 110 and 120 being equal, their drain currents Id110 (111) and Id120 (121) are substantially equal, causing the forward diode current Iled 184 to be substantially equal to the reference current Ics 182.

It should be appreciated that the exemplary current driver circuit 100 functions to keep the forward diode current Iled 184 substantially equal to the reference current Ics 182 despite changes or transients in the voltage from supply voltage sources 105 and 115.

It should be appreciated that the exemplary current driver circuit 100 functions to keep the forward diode current Iled 184 substantially equal to the reference current Ics 182 despite changes in the forward bias voltage.

When Bias1 136 and Bias2 137 of the reference current source 130 are adjusted, the current flowing through reference current source 130 can also be adjusted. According to the operation of operational amplifier 150 as explained above, this amount of current is then also delivered to light emitting diode 180. Therefore, Bias1 136 and Bias2 137 may be used to control the current, and therefore, the light output level of light emitting diode 180.

Because of the configuration of current driver circuit 100 shown in FIG. 2, the level of reference current Ics 182 selected by Bias1 136 and Bias2 137 will be delivered to light emitting diode 180 throughout a wide range of operating conditions. For example, the current delivered to light emitting diode 180 may be determined by Bias1 136 and Bias2 137 for a wide range of supply voltages $V_{DD}$ applied to PMOS transistors 110 and 120 at supply terminal 105.

Although a particular implementation of a reference current source is shown, it is only illustrative and any implementation of reference current source may be used.

Figure 1:
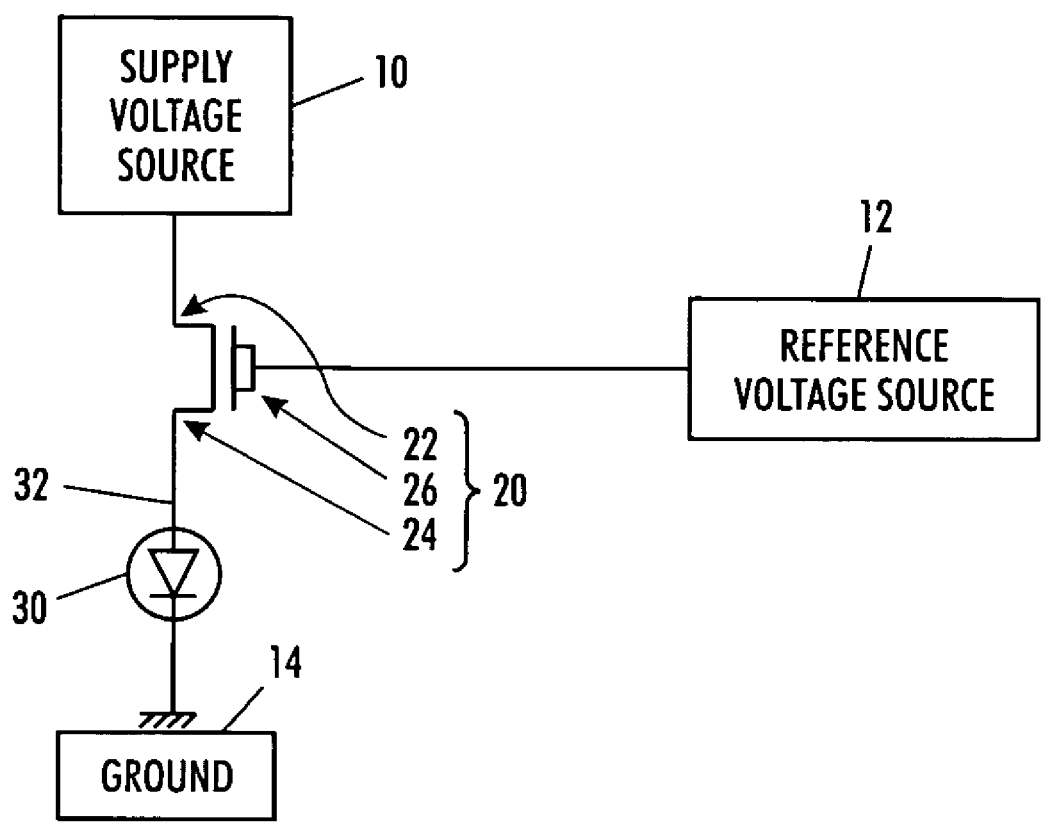
FIG. 1 is a schematic diagram of a known driving circuit for a light emitting diode.

It should be appreciated that the exemplary current driver circuit provides an advantageous output impedance compared to the typical driver of FIG. 1 mentioned earlier. The typical driver of FIG. 1 supplies current to the light emitting diode through a PMOS transistor 20. The output impedance of an output node is the change in its voltage divided by the change in current drawn from the output node. A large output impedance is indicated by a large voltage change at the drain 24 of the PMOS transistor 20 causing only a small change in current drawn from the drain 24. The output impedance of a PMOS device is typically less than that of an NMOS device and much less than that of the series arrangement 130 of NMOS devices 131 ad 132 in FIG. 2. The operational amplifier 150 of FIG. 2 acts to make the magnitude of the output impedance of the drain terminal of the PMOS transistor 120 equal to the output impedance of the reference current source. If the forward bias voltage 174 changes, the operational amplifier acts to change the voltage across the reference current generator 192 by an equal change. The large output impedance of the reference current generator causes the reference current to change very little. The operational amplifier then acts to change the drain current Id110 (111) of PMOS 110 to be equal to the reference current 182 which changes the drain current Id120 (121) of PMOS transistor 120 to also be equal to the reference current 182. Although the forward bias voltage 174 changed, the forward diode current Iled 184 changed only as much as the reference current source would allow given its output impedance. The lower output impedance of the PMOS transistor 120 is preempted. If transistors 110 and 120 are in close proximity as to share thermal environments, lower output impedance of the PMOS transistor 120 is preempted, regardless of heating effects on PMOS transistor 120.

In addition to controlling the amount of forward diode current Iled 184 to light emitting diode 180 using reference current source 130, the forward diode current Iled 184 to light emitting diode 180 may also be turned on and off by the addition of a strobe signal 160 to the circuit, as shown in FIG. 2. In various exemplary implementations, a strobe signal 160 may be connected to the operational amplifier 150, which, when the strobe signal 160 is high, disables the operational amplifier 150, for example, by driving the output node 156 of the operational amplifier 150 to its positive rail, which shuts off the PMOS transistor 120 whose drain is coupled to the light emitting diode 180. The strobe signal 160, when low, may enable the operational amplifier 150 so that the drain current Id120 (121) is delivered to the light emitting diode 180.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. The driving circuit may be applies to any light emitting diode, such as a laser diode, a visible light diode, a vertical cavity surface emitting laser, and so on. More generally, the driving circuit may be applied to any network or networks, having a high impedance node for connection to node 192, and a low impedance node for connection to node 194, where the current versus voltage characteristics of the high and low impedance nodes have a non-zero correspondence. Accordingly, the exemplary implementations set forth above, are intended to be illustrative, not limiting.

What is claimed is:

1. A driving circuit for a light emitting diode, comprising:
    a first transistor having a first gate terminal, a first drain terminal and a first drain voltage at the first drain terminal;
    a second transistor having a second gate terminal, a second drain terminal and a second drain voltage at the second drain terminal;
    a balancing circuit coupled to the first and the second transistors;
    a high impedance load coupled to the first drain terminal and the balancing circuit, a low impedance load coupled to the second drain terminal and the balancing circuit;
    wherein the first and second transistors are responsive to the balancing circuit for causing the first and the second drain voltages to be substantially equal, thereby applying a current to the low impedance load substantially equal to the current applied to the high impedance load,
    wherein the first drain terminal is coupled to a reference current source that delivers a predetermined, but adjustable amount of current from the first drain terminal to a ground potential, and
    wherein the reference current source comprises at least two transistors that are directly connected to each other in series, one of the two transistors having a source terminal coupled to the first drain terminal.

2. The driving circuit of claim 1, wherein the balancing circuit comprises an operational amplifier.

3. The driving circuit of claim 2, wherein the operational amplifier further comprises:
    a non-inverting input;
    an inverting input; and an output.

4. The driving circuit of claim 3, wherein the balancing circuit further comprises:
    a strobe terminal.

5. The driving circuit of claim 4, wherein a ground potential coupled to the strobe terminal activates the operational amplifier output, and a power supply potential coupled to the strobe terminal deactivates the operational amplifier output.

6. The driving circuit of claim 1, wherein an output terminal of the balancing circuit is coupled to the first and second gate terminals.

7. The driving circuit of claim 1, wherein the first and second transistors comprise p-channel metal oxide silicon field effect transistors.

8. The driving circuit of claim 1, wherein the high impedance load is a reference current source and the low impedance load is a light emitting diode.

9. The drive circuit of claim 1, wherein a first bias voltage is supplied to a gate of a first one of the at least two transistors, and a second bias voltage is supplied to a gate of a second one of the at least two transistors.

10. A method for driving a light emitting diode, comprising:
    coupling a drain terminal of a first transistor to a reference current source to provide a first drain terminal voltage;
    comparing the first drain terminal voltage to a second drain terminal voltage on a drain terminal of a second transistor;
    adjusting a gate voltage of a gate terminal of the first and second transistors until the drain terminal voltage of the first transistor is substantially equal to the drain terminal voltage of the second transistor; and
    coupling the drain terminal of the second transistor to a terminal of the light emitting diode,
    wherein the reference current source comprises at least a third transistor and a fourth transistor, the method further comprising:
    directly connecting the third transistor and the fourth transistor in series, and
    coupling a source terminal of one of the third and fourth transistors to the drain terminal of the first transistor.

11. The method of claim 10, further comprising:
    coupling another terminal of the light emitting diode to a ground potential.

12. The method of claim 11, further comprising:
inputting the drain terminal voltage of the first transistor to a first input of an operational amplifier;
inputting a drain terminal voltage of the second transistor to a second input of the operational amplifier; and
outputting an output voltage of the operational amplifier to gate terminals of the first and second transistors so that the drain terminal voltage of the first transistor is substantially equal to the drain terminal voltage of the second transistor.

13. The method of claim 12, further comprising:
coupling a source terminal of the first transistor and a source terminal of the second transistor to a supply voltage.

14. The method of claim 12, wherein the first and second transistors comprise p-channel metal oxide silicon field effect transistors.

15. The method of claim 12, further comprising:
inputting a strobe signal to the operational amplifier.

16. The method of claim 15, further comprising:
outputting a signal from the operational amplifier that disables the first and second transistors when the strobe signal is high; and
outputting a signal from the operational amplifier that enables the first and the second transistors when the strobe signal is low.

17. The method of claim 10, further comprising:
controlling the reference current source by adjusting a gate voltage on at least one transistor of the current source.

18. A driving circuit for a light emitting diode, comprising:
means for coupling a drain terminal of a first transistor to a reference current source to provide a first drain terminal voltage;
means for comparing the first drain terminal voltage to a second drain terminal voltage on a drain terminal of a second transistor;
means for adjusting a gate voltage of a gate terminal of the first and the second transistors until the second drain terminal voltage of the second transistor is substantially equal to the first drain terminal voltage of the first transistor; and
means for coupling the drain terminal of the second transistor to a terminal of the light emitting diode,
wherein the reference current source comprises at least two transistors that are directly connected to each other in series, one of the two transistors having a source terminal coupled to the drain terminal of the first transistor.

19. A driving circuit for a light emitting diode, comprising:
a first transistor having a first gate terminal, a first drain terminal and a first drain voltage at the first drain terminal;
a second transistor having a second gate terminal, a second drain terminal and a second drain voltage at the second drain terminal;
a balancing circuit coupled to the first and the second transistors;
a high impedance load coupled to the first drain terminal and the balancing circuit, a low impedance load coupled to the second drain terminal and the balancing circuit;
wherein the first and second transistors are responsive to the balancing circuit for causing the first and the second drain voltages to be substantially equal, thereby applying a current to the low impedance load substantially equal to the current applied to the high impedance load,
wherein the first drain terminal is coupled to a reference current source that delivers a predetermined, but adjustable amount of current from the first drain terminal to a ground potential, and
wherein the reference current source comprises a third transistor having a source terminal coupled to the first drain terminal and a gate coupled to a first bias voltage terminal.

20. The drive circuit of claim 19, wherein the reference current source further comprises a fourth transistor that is directly connected to the third transistor in series, the fourth transistor having a gate coupled to a second bias voltage terminal.

* * * * *